Figure 1A:
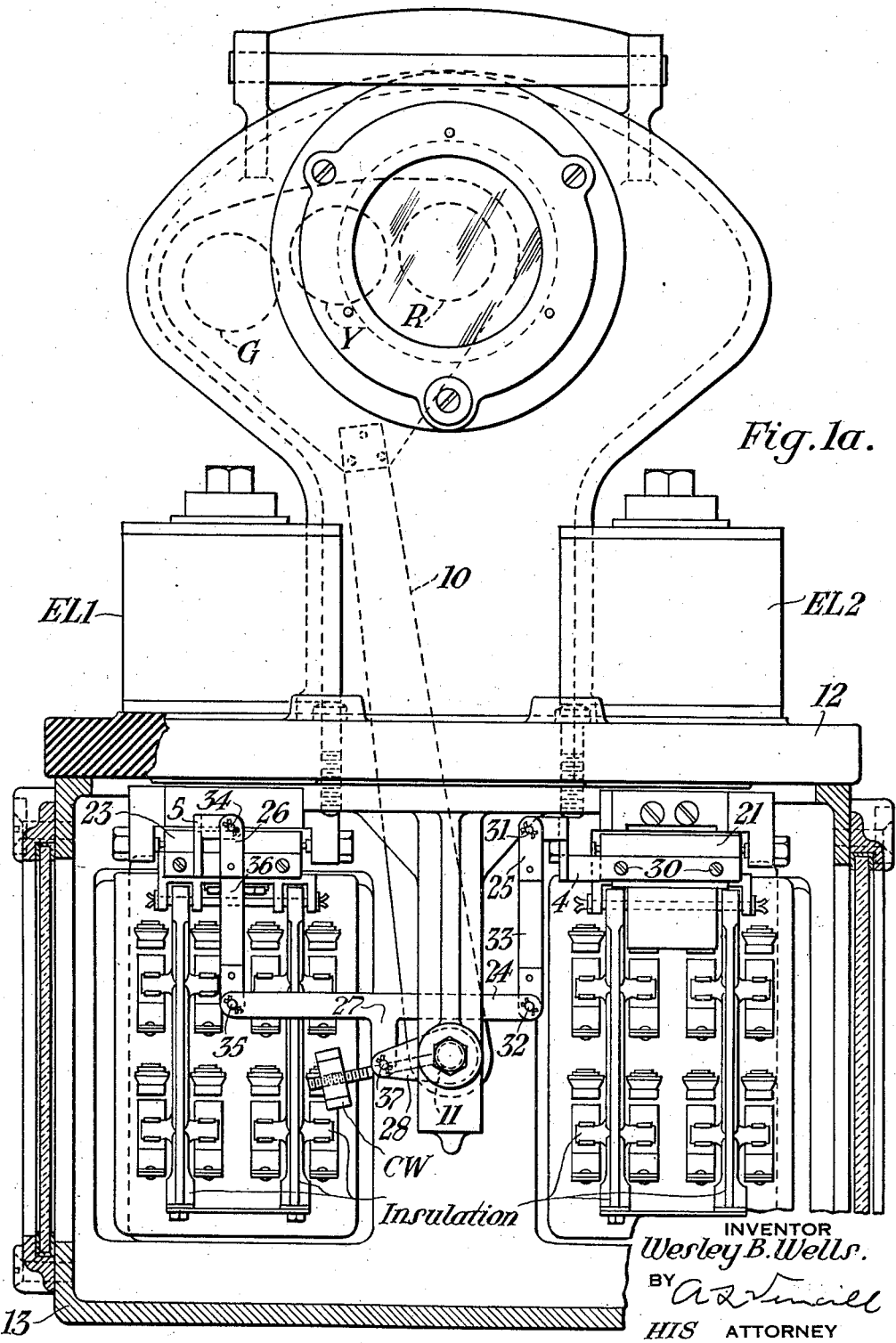

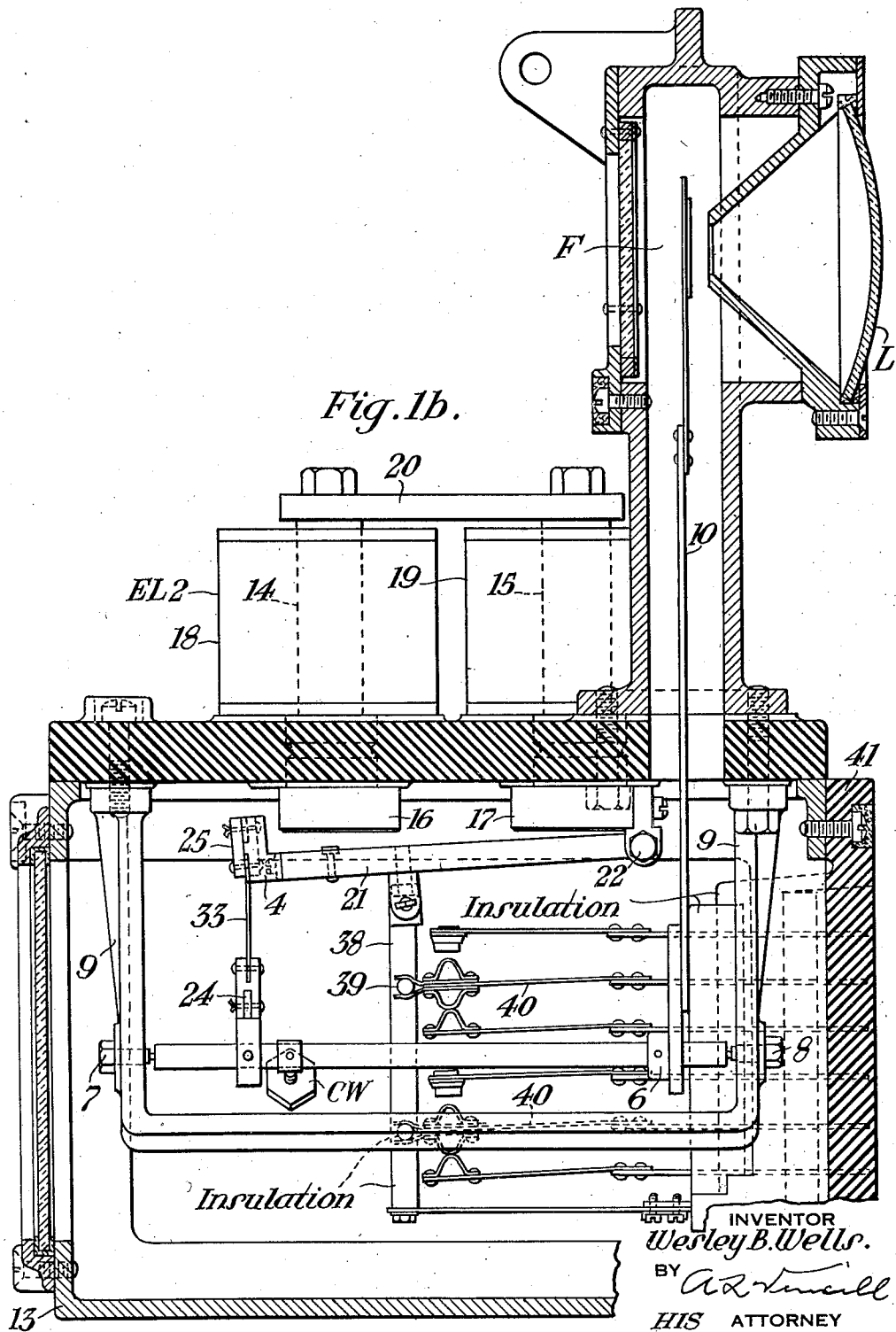

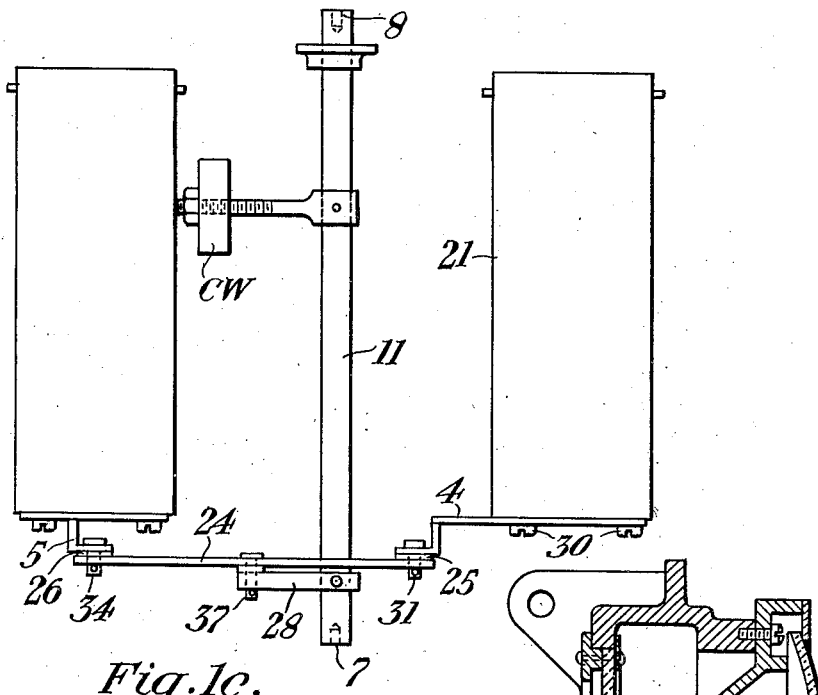
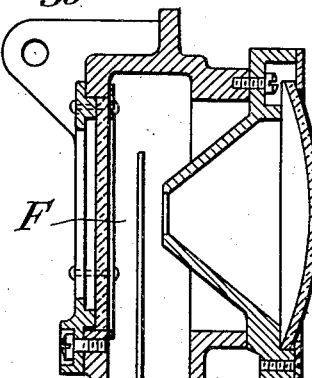
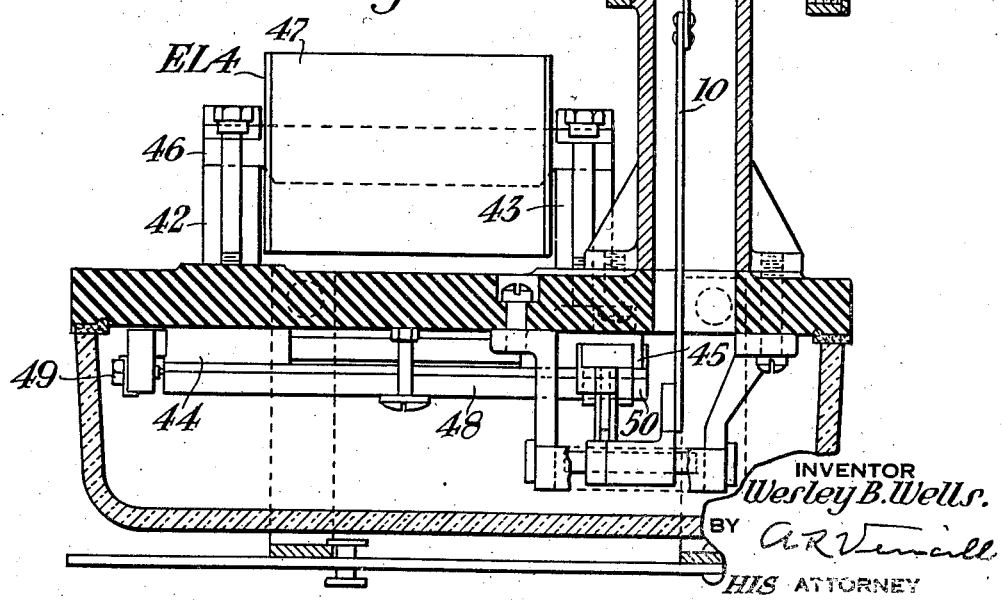

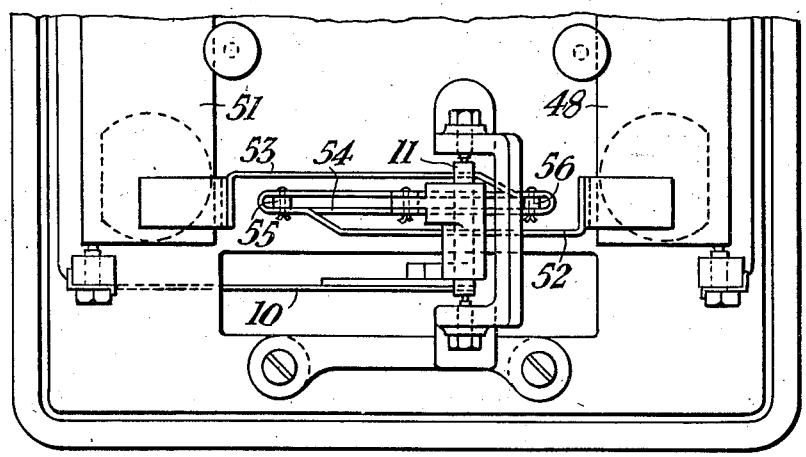
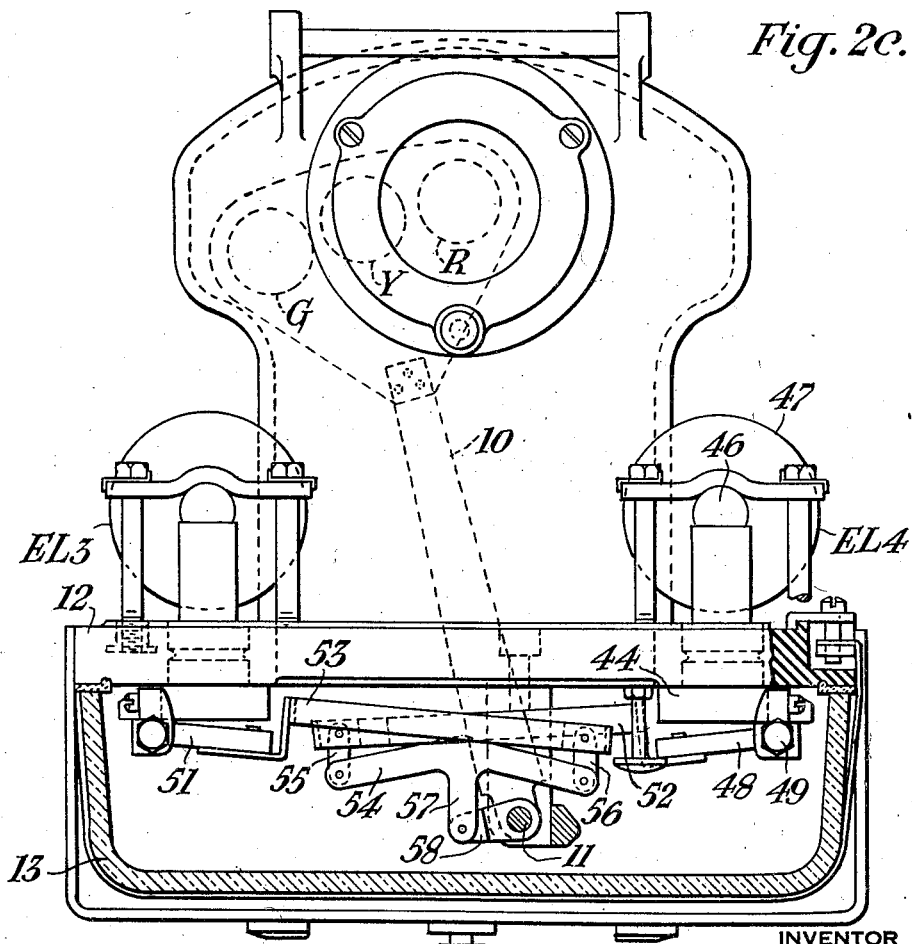
Fig. 2c.
Fig. 2a.
INVENTOR
Wesley B. Wells.
BY
HIS ATTORNEY

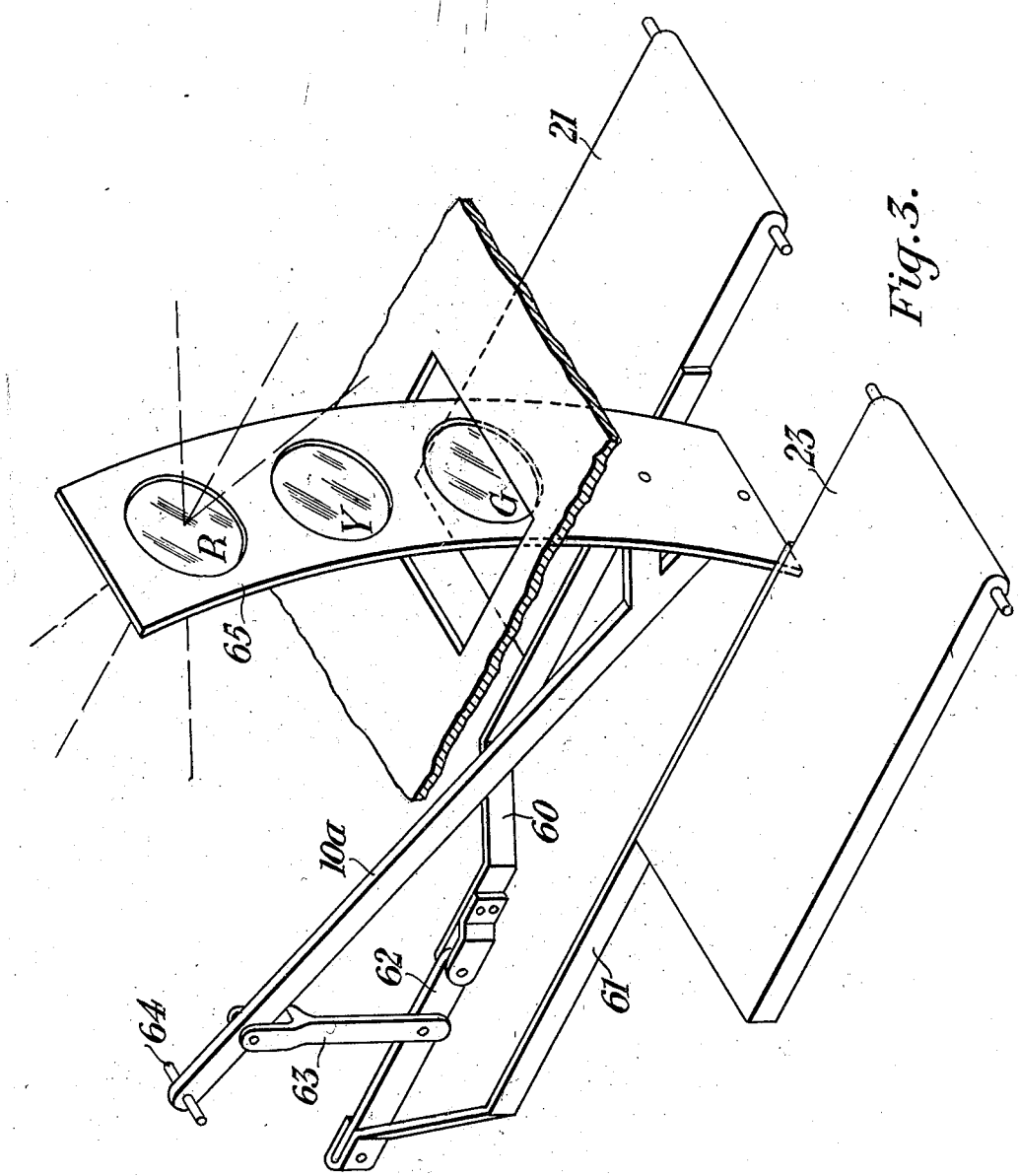

Patented Sept. 10, 1946

2,407,355

UNITED STATES PATENT OFFICE 2,407,355

LIGHT SIGNAL

Wesley B. Wells, Wilkinsburg, Pa., assignor to The Union Switch & Signal Company, Swissvale, Pa., a corporation of Pennsylvania Application August 31, 1943, Serial No. 500,643

7 Claims. (Cl. 175—337)

My invention relates to light signals, and more particularly to light signals for displaying any one of a plurality of different colored lights from a single light source.

Railway signals commonly known as "searchlight" signals, use different color filters which are selectively operated into a light beam to display any one of a plurality of different colored lights. The three colors red, yellow and green are the colors usually employed and a conventional arrangement is to dispose the filters with the red between the yellow and green and to bias the member or spectacle arm which carries such filters to a mid position where the red filter is in the light beam. Electromagnetic means of the rotary type is usually connected to the spectacle arm to rotate the arm either to the left or to the right from the biased mid position to bring the yellow or green filter into the light beam, the direction of rotation of the spectacle arm being effected according to the polarity of the energy supplied to the electromagnetic means. Such construction causes the red filter to pass through the light beam in changing from yellow to green, or vice versa, and a flash of the red signal light results. Also, in such light signals, minimum energy, minimum friction and binding at pivots and linkage in the connections to avoid a false signal, ability to withstand vibration without excessive wear, use of plug-in type of circuit connectors and minimum space are essential characteristics.

Accordingly, a feature of my invention is the provision of novel and improved mechanism for a multiple color light signal wherewith a member is gravity biased to one extreme or first position and is successively operated by electromagnetic means to a second and thence a third or another extreme position to avoid unwanted red signal flashes during a change in the position of the signal mechanism.

Another feature of my invention is the provision of novel and improved means for interconnecting the armatures of two electromagnets for operating a member to any one of three different positions according as the electromagnets are deenergized, one magnet only is energized or both magnets are energized.

Again, a feature of my invention is the provision of an improved mechanism for light signals of the searchlight type and wherewith the operating electromagnets are disposed for minimum space and use of plug-in type of circuit connectors and are arranged for minimum friction and binding at the pivots and linkage by which the armatures of the electromagnets are operatively connected to a three-position actuating member.

Other features, objects and advantages of my invention will appear as the specification progresses.

To accomplish the foregoing features and advantages of my invention I provide two tractive armature type electromagnets side by side with a given space between them, and which magnets are disposed for their armatures to be pivoted in the same horizontal plane. An extension member or arm is attached to each armature at its free end and these extension members are offset or otherwise disposed to bring their free ends in the same plane. A floating lever is pivotally attached at its ends to these extension members, and this floating lever in turn is pivotally connected intermediate its ends by means of a link or depending arm to a three-position member which is pivoted at one end and carries at its other ends color filters movable with respect to a light beam. The parts are so proportioned as to gravity bias this three-position actuating member to a first extreme position and the linkage connections are such that this member is operated through the floating lever to a second and a third position according as one or both electromagnets are energized. This disposition of the electromagnets requires minimum space and permits use of plug-in type circuit connectors. Also this construction permits the pivots and linkage to be located in parallel planes for minimum friction and binding without lost motion connections so that the construction is not subject to excessive wear due to vibration. Furthermore, with friction reduced to a minimum, the mechanism is operated with a minimum amount of power.

I shall describe three forms of apparatus embodying my invention, and shall then point out the novel features thereof in claims.

Referring to the drawings, Figs. 1a and 1b are front and side views, respectively, partly in section, showing one form of mechanism embodying my invention. Fig. 1c is a plan view showing the floating lever and armature arrangement of the mechanism of Figs. 1a and 1b. Figs. 2a and 2b are front and side views, respectively, partly in section, showing a second form of mechanism embodying my invention, and Fig. 2c is a plan view showing the floating lever and armature arrangement of the mechanism of Figs. 2a and 2b. Fig. 3 is an isometric view showing a modification of the mechanism of Figs. 1a and 1b which I may use, and which also embodies my invention.

In each of the different views like reference characters designate similar parts.

Referring to Figs. 1a and 1b, a housing 13 is provided with a non-magnetizable top plate 12 on which two electromagnets EL1 and EL2 are mounted in parallel planes spaced a given distance apart. Looking at Fig. 1b, the electromagnet EL2 comprises two magnetic cores 14 and 15 secured in the top plate and terminating at their lower ends on the under side of the top plate in pole pieces 16 and 17, respectively. Two coils 18 and 19 are mounted on cores 14 and 15, respectively, and the top ends of the cores are joined by a magnetizable back strap 20 so that coils 18 and 19 when supplied with energizing current create a magnetic flux in this core structure. An armature 21 is trunnioned at 22 to cooperate with the pole pieces 16 and 17, armature 21 being pivoted in a transverse plane and gravity biased to a released position, and attracted to a picked-up position when the magnet is energized. Electromagnet EL1 is similar in construction, and it is sufficient to point out that its armature 23 is pivoted in a transverse plane and gravity biased to a released position when that magnet is deenergized and is attracted to a pickup position when the magnet is energized.

The two armatures 21 and 23 are interconnected through extension members or arms 4 and 5, two links 25 and 26 and a floating lever 24. Extension member 4 is secured by screws 30 to the free end of armature 21, and the free end of member 4 in turn is pivotally connected at 31 to the top end of link 25. Similarly, extension member 5 is secured to the free end of armature 23 and the free end of member 5 is in turn pivoted at 34 to the top end of link 26. The extension members 4 and 5 are disposed for their free ends to align so that links 25 and 26 are in the same vertical plane but some distance apart. Links 25 and 26 include flexible strips 33 and 36, respectively, and the lower ends of the links are pivoted at 32 and 35 to the opposite ends of floating lever 24, lever 24 being in a plane at right angles to the plane of movement of armatures 21 and 23, with flexible strips 33 and 36 serving to avoid binding at the pivot points.

A shaft 11 is pivotally mounted at 7 and 8 in two depending supports 9 carried on the underside of the top plate 12, the axis of shaft 11 being in a plane parallel to the vertical plane of the electromagnets at a point intermediate the two magnets. A crank arm 28 secured to shaft 11 is pivotally connected at 37 to a depending arm or lug 27 formed on floating lever 24 intermediate its ends. A counterweight CW is preferably secured to shaft 11 to aid in biasing the shaft and associated parts to a given position as will appear shortly.

An actuating member 10, secured to shaft 11 at 6 extends through top plate 12 and carries at its outer end a red filter R, a yellow filter Y and a green filter G for rotation of these filters through a focal point F of an optical assembly in response to rotation of shaft 11. The optical assembly may be of any one of several well-known constructions that includes an electric lamp, a reflector and a lens. For the sake of simplicity, such optical assembly is shown only as required for an understanding of my invention, and it is sufficient for the present application to point out that a large percentage of the rays of a lamp are reflected to converge at a focal point F and diverge to cover the surface of a cover glass L, with the result there is displayed a signal light of a color corresponding to which one of the color filters R, Y or G is positioned at the focal point F.

The parts consisting of armatures 21 and 23, links 25 and 26, floating lever 24, and counterweight CW gravity bias the shaft 11 and in turn member 10 to a given position, and at which position of the member 10 the filter R is positioned at the focal point F. That is to say, the actuating member 10 is biased by gravity to a first position when the magnets EL1 and EL2 are deenergized so that their respective armatures are released. If magnet EL1 is energized and magnet EL2 is deenergized, armature 23 is picked up to rotate the floating lever 24 about pivot 32 and shaft 11 is rotated to its second position and at which second position the filter Y is brought to the focal point. Likewise, if magnet EL2 is energized to pick up its armature 21, and magnet EL1 is deenergized, the floating lever 24 is rotated about pivot 35 and shaft 11 is rotated to its second position where the color filter Y is at the focal point. Energization of both magnets EL1 and EL2 to pick up both armatures 21 and 23, raises floating lever 24 to a still higher position, and shaft 11 is rotated to its third position where the filter G is brought to the focal point F.

As best shown in Fig. 1b, a contact actuating member 38 carried on armature 21 of electromagnet EL2 is provided with pins 39 and which pins cooperate with contact fingers 40 to close front and back contacts according as the armature 21 is picked up or released. These contact fingers and front and back contact members are secured in an insulating member 41 made a part of the housing 13 and forming a portion of a plug-in type of circuit connector of the usual arrangement. In like fashion circuit contact members are actuated by armature 23 of the electromagnet EL1.

It is to be seen from the foregoing description, that Figs. 1a, 1b and 1c disclose a construction for a light signal which has the advantages that the actuating member 10 is successively operated to a first, a second and a third position to avoid a red "signal flash" during a change in the position of the mechanism, the electromagnets are mounted side by side to minimize space when the signal is to be located between tracks of a railway, the armatures of the two electromagnets are pivoted in a transverse plane for operation of contact members that are satisfactory for plug-in type of circuit connectors, the pivots and flexible members of the linkage minimize friction and binding so that minimum power is required in operating the mechanism and probability of the mechanism sticking in a false "clear" position is remote. Also lost motion in the connections is not required and wear on the pivots due to vibration is avoided.

Referring to Figs. 2a, 2b and 2c, which disclose another form of mechanism embodying my invention, the color filters R, Y and G are carried in an actuating member 10 secured to a pivoted shaft 11 for rotation of the filters to the focal point of an optical assembly in substantially the same manner as in the mechanism of Figs. 1a and 1b. Rotation of shaft 11 of Figs. 2a and 2b is effected by two electromagnets EL3 and EL4 mounted side by side with some space between them on a non-magnetizable top plate of a suitable housing, the same as in the previous case. Looking at Fig. 2b, electromagnet EL4 includes two cores 42 and 43 which terminate in pole pieces 44 and 45, respectively, on the underside of the associated top plate, and which cores are joined at the top ends by a back strap 46 having a winding 47 mounted thereon. An armature 48 of electromagnet EL4 is trunnioned at 49 and 50 in a longitudinal plane and is biased by gravity to a released position when the associated magnet is deenergized, and is attracted to a picked up position when the associated magnet is energized. Electromagnet EL3 is of similar construction, its armature 51 being pivoted in a longitudinal plane and the two armatures 48 and 51 being arranged for their free ends to be toward each other. Extension members or arms 52 and 53 are secured in any suitable manner to the free ends of armatures 48 and 51, respectively, arms 52 and 53 being disposed in parallel planes and each such arm or extension member extending toward the other armature. A floating lever 54 is carried on extension members 52 and 53 by one end of lever 54 being pivoted to the free end of member 52 through a short depending link 55, and the other end of lever 54 being pivoted to the free end of extension member 53 through a short depending link 56. Floating lever 54 is formed with a depending arm 57 intermediate its ends, and which arm 57 is pivoted to a crank arm 58 secured on shaft 11.

The parts comprising armatures 48 and 51, extension members 52 and 53 and floating lever 54 are proportioned so as to gravity bias the actuating member 10 to a first position where the filter R is at the focal point of the associated optical assembly. That is, when both electromagnets EL3 and EL4 are deenergized, the actuating member 10 is set at its first position. If magnet EL4 is energized to attract its armature 48 and magnet EL3 is deenergized, the left-hand end of floating lever 54 is raised about the pivot at its right-hand end, and the actuating member 10 is rotated to a second position where the filter Y is brought to the focal point. Also, if magnet EL3 is energized to attract its armature 51, and magnet EL4 is deenergized, the right-hand end of floating lever 54 is raised about the pivot at its left-hand end and the actuating member 10 is rotated to its second position. If both magnets EL3 and EL4 are energized to atttract their respective armatures, the floating lever 54 is raised to a position where the actuating member 10 is moved to its third position to bring the green filter G at the focal point.

It is clear that in the embodiment of the invention disclosed in Figs. 2a, 2b and 2c there is disclosed a mechanism wherein the pivots are all in parallel planes. Also, connecting links 55 and 56 prevent binding which would be caused by the armatures and floating levers rotating about different centers, and also allows lateral motion of the floating lever which is necessary when the operating crank 58 is actuated. It follows, therefore, that the mechanism of Figs. 2a, 2b and 2c has the advantages that its pivots are all in parallel planes to avoid friction and binding, actuating member 10 is successively operated to three different positions to avoid unwanted red signal flashes, minimum space is required, and contacts (not shown) can be actuated by the armatures of the electromagnets satisfactory for plug-in types of circuit connectors.

Referring to Fig. 3, which discloses a modification of the mechanism of Figs. 1a and 1b, armatures 21 and 23 of electromagnets EL2 and EL1, respectively, are pivoted in a transverse plane with some space between them as explained hereinbefore. Extension members 60 and 61 secured to the armatures are of different lengths and are offset inwardly so that their free ends are disposed in alignment approximately half-way between the two armatures. A floating lever 62 is pivotally attached at its ends to the free ends of the extension members 60 and 61 and is pivotally connected intermediate its ends by means of a link 63 with an actuating member 10a. Actuating member 10a is pivoted at one end at point 64 and carries at its other end a cylindrical member 65 having three color filters R, Y and G arranged in the order named, with the filter R at the top. To compensate for the differences in the length between extension members 60 and 61, the link 63 is pivotally attached to floating lever 62 at a point which is closer to the member 60 than it is to the member 61.

The parts are so proportioned that when both armatures 21 and 23 are released, that is, when both associated electromagnets are deenergized, member 10a is biased for the filter R to be at the focal point of the associated optical assembly. When either armature 21 or 23 is picked up and the other armature is released, the member 10a is operated to a second position to bring the yellow filter Y at the focal point, and when both armatures are picked up, the member 10a is operated to its third position to bring the green filter G to the focal point. The armatures 21 and 23 of Fig. 3 are pivoted in transverse planes and consequently contact members can be actuated by each armature satisfactory for plug-in type of circuit connectors.

It is clear that the light signal mechanism disclosed in Fig. 3 has the same advantages as the mechanism of Figs. 1a and 1b.

Although I have herein shown and described only three forms of light signals embodying my invention, it is understood that various changes and modifications may be made therein within the scope of the appended claims without departing from the spirit and scop of my invention.

Having thus described my invention, what I claim is:

1. In a light signal the combination comprising, two electromagnets mounted in parallel vertical planes a given distance apart and each provided with a tractive armature and which armatures are transversely pivoted in the same horizontal plane, a shaft pivoted between said magnets with its axis parallel to the vertical planes of the magnets and in a horizontal plane below the horizontal plane of the armatures, two extension members one secured to the free end of each of said armatures and said extension members arranged with their free ends aligned, floating lever disposed with its axis above said shaft and at right angles to the vertical planes of said magnets, two links one pivotally connected between the free end of one of the extension members and one end of said lever and the other pivotally connected between the free end of the other extension member and the other end of said lever, each of said links including a flexible strip, said lever formed intermediate its ends with a depending arm which is pivoted to a crank arm secured to said shaft, whereby said shaft is operated to any one of three different positions according as said magnets are both deenergized, one magnet only is energized or both magnets are energized, and said operation of said shaft being effected with friction and binding minimized due to said pivots and flexible strips.

2. In a light signal the combination comprising, two electromagnets mounted in parallel vertical planes a given distance apart and each provided with a tractive armature and each of which armatures is transversely pivoted in a given horizontal plane, a shaft mounted between said magnets with its axis parallel to the vertical planes of said magnets and in a horizontal plane below the horizontal plane of said armatures; two extension members one secured to each of said armatures and said extension member disposed with their free ends aligned in a vertical plane at right angles to the vertical planes of said magnets, two links one pivoted to the free end of each of said extension members, a floating lever disposed in the vertical plane of the free ends of said extension members and pivotally connected to each of said links, and a crank arm secured to said shaft and pivotally connected to said floating lever at a point intermediate its connections to said links to rotate said shaft to different positions according to the released and picked up positions of said armatures.

3. In a light signal the combination comprising, two laterally spaced electromagnets each having a transversely pivoted armature, a shaft pivotally mounted between said magnets with its axis parallel to the vertical planes of the magnets and in a horizontal plane below the horizontal plane of said armatures, two links one having one end pivotally mounted to the free end of one of said armatures and the other link having one end pivotally mounted to the free end of the other one of said armatures, a floating lever disposed at right angles to the axis of said shaft and having its ends pivotally connected to said links, and a crank arm secured to said shaft and pivotally connected to said floating lever at a point intermediate its ends for rotation of said shaft to different preselected positions according to the released and picked up positions of said armatures.

4. In a light signal the combination comprising, two laterally spaced electromagnets each having a transversely pivoted armature, said armatures being pivoted in the same horizontal plane, a shaft pivotally mounted between said magnets with its axis parallel to the vertical planes of said magnets and in a horizontal plane spaced a preselected distance below said horizontal plane of said armatures, a floating lever disposed at right angles to the axis of said shaft, two links each including a flexible strip, said floating lever having one end pivotally connected to one of said armatures through one of said links and its other end pivotally connected to the other armature through the other one of said links, and a crank arm secured to said shaft and pivotally connected to said lever intermediate its ends for operation of said shaft to different preselected positions by a pulling action through said links in response to the picking up of said armatures with friction and binding minimized due to said pivot connections and flexible strips.

5. In a light signal the combination comprising, two laterally spaced electromagnets each having a tractive type armature, each of said armatures longitudinally pivoted and the two armatures pivoted in the same horizontal plane, an extension member secured to each of said armatures and extending toward the other armature to a point beyond the center line between said magnets, said extension members having their free ends aligned in a vertical plane at right angles to the vertical planes of said magnets, a floating lever disposed in the vertical plane of the free ends of said extension members and below the extension members, two links one pivotally connected between one end of said floating lever and the free end of one of the extension members and the other link pivotally connected between the other end of the lever and the free end of the other extension member, a shaft pivotally mounted between said magnets at a point below said floating lever and in a vertical plane parallel to the vertical planes of the magnets, and means to pivotally connect an intermediate point of said floating lever to said shaft to operate the shaft to different preselected positions according to the picked up and released positions of said armatures.

6. In a light signal the combination comprising, a two laterally spaced electromagnets each having a tractive type armature, each of said armatures longitudinally pivoted and the two armatures pivoted in the same horizontal plane, an extension member secured to each of said armatures and extending toward the other armature to a point beyond the center line between said magnets, said extension members offset for their free ends to align, a shaft pivotally mounted between the magnets with its axis parallel to the vertical planes of the magnets and in a horizontal plane below the pivot horizontal plane of the armatures, a floating lever disposed above the horizontal plane of said shaft and below the horizontal plane of the free ends of said extension members, two links one pivotally connected between one end of said lever and the free end of one of said extension members and the other pivotally connected between the other end of the lever and the free end of the other extension member, and a crank arm secured to said shaft and pivotally connected to an intermediate point of said floating lever to rotate said shaft to different preselected positions according to the picked up and released positions of said armatures.

7. In a light signal the combination comprising, two electromagnets mounted in parallel vertical planes a given distance apart and each provided with a tractive armature and which armatures are pivotally mounted in the same horizontal plane, a shaft journaled with its axis parallel to the vertical planes of said magnets and in a horizontal plane below the horizontal plane of said armatures, two extension members one secured to each of said armatures and said extension members disposed for their free ends to align in a horizontal plane above the horizontal plane of said shaft, two links one pivoted to the free end of one of said extension members to extend downward and the other link pivoted to the free end of the other extension member to extend downward, a floating lever having its ends pivoted to the free ends of said links and formed intermediate its ends with a depending arm, and a crank secured to said shaft and pivotally connected to said depending arm whereby said shaft is biased to an initial position when both said magnets are deenergized, is rotated to an intermediate position when one of the magnets is energized and the other magnet is deenergized and is rotated to an extreme position when both magnets are energized with binding and friction at the pivots minimized.

WESLEY B. WELLS.